Dec. 19, 1961 C. L. BROWN 3,013,533
BRAKE SERVO-MOTOR
Filed Jan. 4, 1960 2 Sheets-Sheet 1

INVENTOR.
CURTIS L. BROWN
BY
Irvin L. Groh
ATTORNEY.

Dec. 19, 1961  
C. L. BROWN  
3,013,533  
BRAKE SERVO-MOTOR  
Filed Jan. 4, 1960  
2 Sheets-Sheet 2

INVENTOR.  
CURTIS L. BROWN  
BY  
Irvin L. Groh  
ATTORNEY.

United States Patent Office 3,013,533
Patented Dec. 19, 1961

3,013,533
BRAKE SERVO-MOTOR
Curtis L. Brown, Owosso, Mich., assignor to Midland-Ross Corporation, Cleveland, Ohio, a corporation of Ohio
Filed Jan. 4, 1960, Ser. No. 233
6 Claims. (Cl. 121—41)

This invention relates to differential servo-motors and more particularly to the type of servo-motors used to operate the hydraulic brake systems of motor vehicles.

In many present power brake arrangements no braking occurs until sufficient manual effort is exerted by the operator to overcome the resistance of return springs and the friction of certain movable parts in the servo-motor, master cylinder and in the actuators and at the brake shoes of the foundation brake unit. After these resistances are overcome, braking of the vehicle is initiated and results from the sum of the manual effort and the powered effort supplied by the servo-motor. In other words, substantial manual effort is utilized before power comes into play to assist the manual effort in the braking.

This is undesirable since it is of importance to maintain a relatively uniform relationship between the manual effort and the power throughout the entire range of braking and yet, a relatively large initial manual effort is required without resulting in any braking.

It is a general object of the present invention to utilize power to overcome the initial resistances to braking so that manual effort comes into play after actual braking begins. This results not only in a much smaller initial manual force to initiate braking but results in a relatively uniform relationship of manual force and power throughout the entire braking range.

It is another object of this invention to provide a brake servo-motor in which initial brake pedal movement is used to actuate valve control mechanism producing powered force which is transmitted to the braking system before any manual effort is applied to the brakes.

These and other objects are attained by the present invention, various novel features of which will be apparent the following description and from the accompanying drawings disclosing a preferred embodiment of the invention.

Referring to the drawings.

Figure 1:
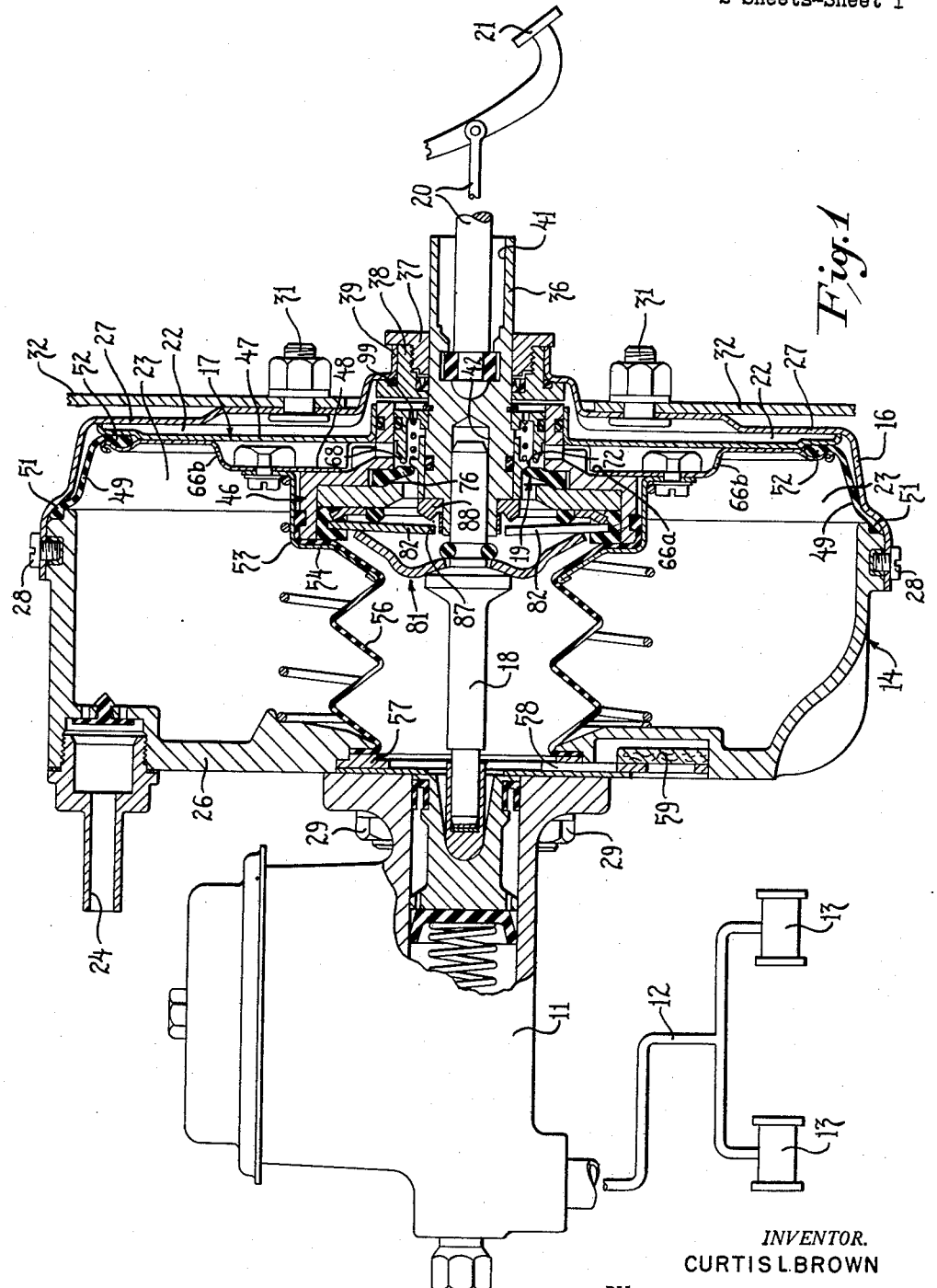
FIG. 1 is a longitudinal sectional view through the servo-motor with the master cylinder shown partly in section.

The differential pressure servo-motor embodying the invention has particular utility in hydraulic brake systems of the type illustrated diagrammatically in FIG. 1. In such systems, hydraulic fluid is delivered from a master cylinder 11 through lines 12 to actuators 13 which apply the brakes at the wheels (not shown). These components are of conventional construction and their operation and use is so well known in the art that a detailed description is not required for a full understanding of the invention.

When the master cylinder 11 of such brake systems is actuated by a fluid pressure servo-motor rather than by manual force, the brake system is referred to as a power brake system.

As seen in FIG. 1, a servo-motor 14 embodying the invention includes a housing 16 in which a movable wall 17 responds to pressure differentials to move a rod 18 which actuates the master cylinder 11 mounted on the housing. The pressure differential acting on the wall 17 is under the control of a valve means 19 actuated manually through means of a line 20 connected to a brake pedal 21.

The servo-motor 14 is of the vacuum suspended type, that is, in its brake released condition, as shown in FIG. 1, vacuum or subatmospheric pressure exists in chambers 22 and 23 formed in the housing at opposite sides of the wall 17 and the wall remains stationary. To actuate the motor, atmospheric air is admitted to the chamber 22 so that the pressure differential on the wall 17 moves it and the rod 18 to actuate the master cylinder 11. The source of vacuum pressure is provided by placing the intake manifold of an internal combustion engine (not shown) in communication with a passage 24.

The housing 16 is made up of a forward housing member 26 and a rearward housing member 27 joined together by screws 28. The forward housing member 26 is provided with fastening means 29 by which the master cylinder 11 may be fastened directly to the housing 16 in position for the master cylinder piston 30 to receive the forward end of the rod 18. The rearward housing 27 is provided with studs 31 by which the housing may be connected to a portion of a vehicle, such as an engine compartment wall 32, in position to receive the link 20 from the brake operating pedal 21.

A manual control member 36 is supported for axial movement in a bearing made up of two elements 37 and 38 threaded together to grip opposed surfaces of a flange 39 formed by the rear housing member 27. The rearward end of the member 36 is provided with a bore 41 to receive the forward end of a the link 20 and the forward end of member 36 is provided with a bore 42 to slidably receive the rearward end of the rod 18.

Figure 2:
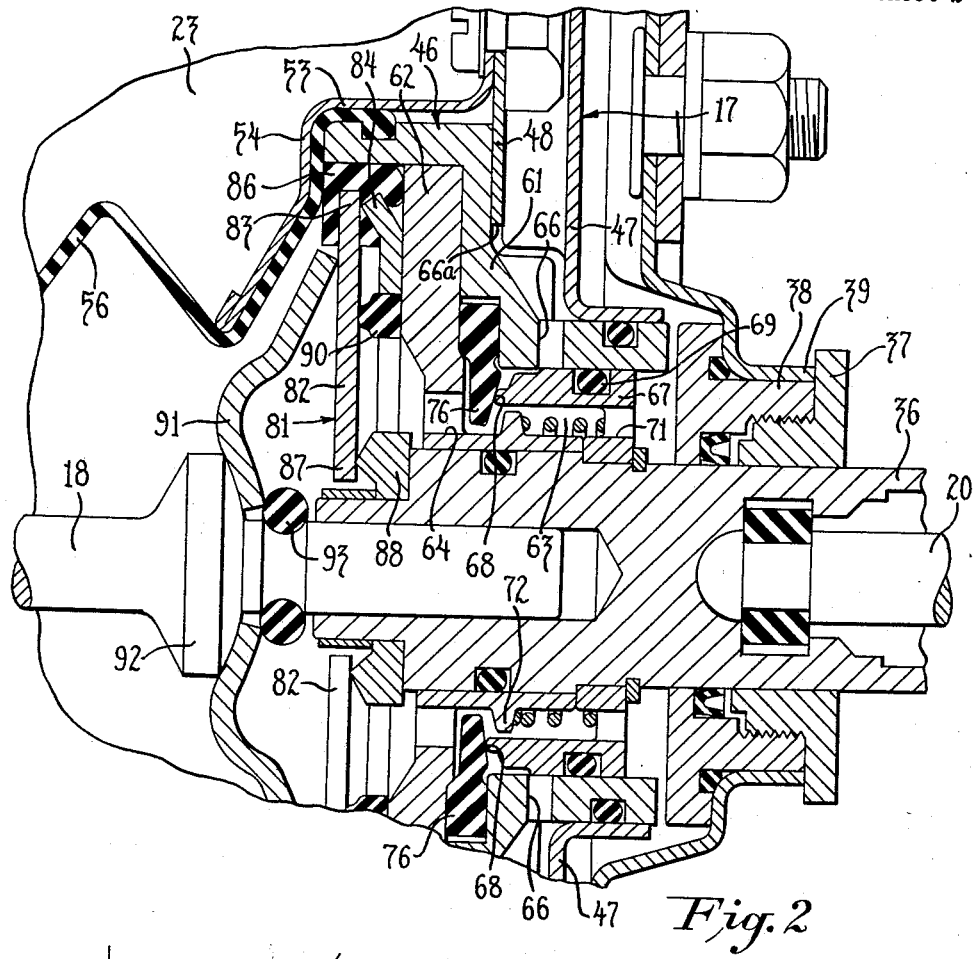
FIG. 2 is an enlarged view of a portion of the mechanism shown in FIG. 1 but illustrating a different condition of operation.

The movable wall 17 includes a hub assembly 46 slidably supported on the control member 36, a pair of plates 47 and 48 and an annular diaphragm 49. The diaphragm has its outer circumferential edge 51 clamped between the housing members 26 and 27 and the inner circumferential edge 52 clamped between the plates 47 and 48 which may be fastened together by rivets or welding. As best shown in FIG. 2, the plates 47 and 48 are connected to the hub 46 by means of a clamp element 53 connected to the plate 48 and having a flange 54 coacting with a forward portion of the hub to fasten one end of a tubular bellows element 56 to the hub 46. A forward portion of the bellows element 56 is connected to the forward housing member 26 by a ring 57 (FIG. 1). The interior of the bellows 56 communicates with the atmosphere through a passage 58 and an air filter 59 and affords a source of atmospheric pressure for actuating the servo-motor.

The valve means 19 which is actuated manually and controls the differential pressures acting on the movable wall 17 is incorporated in the hub 46 of the movable wall and in the manual control member 36. As best seen in FIG. 2, the hub 46 is made of two portions 61 and 62 fastened together to form an annular valve chamber 63. The valve chamber communicates through passages 64 with the interior of the tubular bellows member 56 and through passages 66 and openings 66a and 66b in plate 48 with the chamber 23 located forwardly of the movable wall 17 and externally of the tubular bellows member 56.

A collar 67 is rigidly connected to the control member 36 and forms an annular valve seat 68. The collar 67 is provided with a seal 69 which engages the outer wall of the valve chamber 63 to prevent communication between opposite sides of the collar except through ports 71. A second annular valve seat 72 is formed within the chamber by the hub portion 62. A generally annular or ring-like valve element 76 made of resilient material such as rubber, is disposed at one side of the valve seats 68 and 72 and has its outer circumference 77 clamped between the hub portions 61 and 62. The inner circumference 78 of the valve element is disposed in position to normally engage the inner annular valve seat 72 formed within the valve chamber. Under these conditions, the valve element 76 prevents communication between opposite sides of the valve seat 72 and permits communication between the chambers 22 and 23 by way of the openings 66a and 66b, through ports 66, through the annular space between the valve element 76 and valve seat 68 and through the port 71.

The valve seat 68 is disposed in the path of communication between chambers 22 and 23. Consequently, movement of the control member 36 to the left from the position in FIG. 1 places the seat 68 in engagement with the valve element and isolates the chambers 22 and 23 from each other. Slight additional movement of the control member 36 is effective to deflect the resilient valve element 76 so that it becomes disengaged from the valve seat 72 but remains in engagement with the valve seat 68. The chambers 22 and 23 remain isolated from each other but chamber 22 is placed in communication with the interior of the bellows through passages 64, around valve seat 72 and through passages 71. This admits atmospheric air from the bellows 56 to chamber 22 and causes a differential pressure to act on the wall 17 which causes movement of the latter to the right from the position shown in FIG. 1.

Movement of the wall 17 in response to differential pressure and movement of the control member is transmitted to the rod 18 through force transmitting means 81 which includes a plurality of levers 82 disposed radially in spaced relation and having their outer ends 83 abutting a ring element 84 and connected thereto by a rubber-like ring 86 vulcanized to the levers 82 and ring element 84 but permitting relative movement. The ring element 84 and levers 82 are held in position relative to the wall 17 through means of the bellows 56 and the clamp element 53. The inner ends 87 of the levers 82 are adapted to engage an element 88 which is made of wear-resistant material and is rigidly connected to the control member 36. However, in the position shown in FIG. 1, the lever ends 87 are held in spaced relation to the ring element 88 by a reaction control element 90 in the form of a large ring made of flexible, resilient material such as rubber. The reaction element 90 is maintained in abutting relation to the hub member 61 and ring 84 by the levers 82. An intermediate portion of the levers between the end 83 and the reaction element 90 engages a dished plate element 91 supported on the output member 18 and held between an enlarged portion 92 and a flexible O-ring retainer 93.

In a released condition of the brakes, the servo-motor parts occupy the position shown in FIG. 1, that is, the wall 17 is in its rearward position with a flange 96 on the plate 47 engaged with the housing member 27 to limit rearward movement of the wall 17. In addition, the valve element 76 is engaged with the valve seat 72 and disengaged from the valve seat 68. This permits communication between chambers 22 and 23 but isolates them from the atmosphere in the bellows 56 so that the wall 17 remains stationary. At the same time, the lever ends 87 are spaced from the bearing ring 88 a distance slightly greater than the spacing of the valve seat 68 and the valve element 76.

Initial movement of the control member 36 to the left in response to manual effort applied to the pedal 21 causes the valve seat 68 to approach and engage the valve element 76 to isolate chambers 22 and 23 from each other. Valve seat 72 remains engaged with the valve element and chambers 22 and 23 are also isolated from the source of atmospheric air in the bellows 56. Under these conditions the valve means are disposed in a lap position, that is, an intermediate position in which any additional movement of the control member will result either in actuation of the valve or in returning it to its normal condition. During such initial movement, the bearing element 88 also approaches but remains in spaced relation to the lever ends 87.

Upon an additional movement of control member 36, the valve seat 68 deflects the valve element 76 so that the inner edge moves from engagement with the valve seat 72. This places the valve chamber 63 in communication with the bellows 56 and permits free flow of fluid through the passage 64 and through the spaces between the levers 82. From the valve chamber 63, atmospheric air begins to enter the chamber 22 through passages 66, openings 66a and 66b. Since subatmospheric air is maintained in chamber 23, the resulting differences in pressure at opposite sides of the wall 17 cause the latter to move to the left in the housing. The output member 18 remains stationary and as a consequence, the ring 84 urges the lever ends 83 to pivot about the point of contact with the plate 84 so that the inner lever ends 87 approach bearing element 88. In doing so, the resilient reaction ring is distorted and offers a resistance to pivoting of the levers 82. This results in a force being applied to the plate 91 and the output member 18 so that actuation of the master cylinder is initiated. As pressure in chamber 22 increases and the wall 17 continues to move, the reaction element is compressed further until the lever ends 87 engage the bearing 88. During this time, the output of pressure from the master cylinder has increased and upon engagement of the levers with the bearing 88, manual force applied to the control member 36 is added to the force produced by the moving wall. These forces are applied to the levers 82 and consequently, the plate 91 and output member 18 to increase the hydraulic output from the master cylinder.

Thus far the initial movement of the pedal 21 and the control member 36 has been utilized to actuate the valve means and the force applied to the master cylinder results from wall movement which also acts to compress the reaction element 90 until lever ends 87 engage the bearing 88. Thereafter, the force applied to the master cylinder is the sum of the forces due to pressure differential acting on the wall and manual effort on the pedal 21.

To increase the output of the master cylinder, that is, the force with which the brakes are being applied, the pedal 21 must be moved additionally. This continues the movement of the control member 36 and since the wall 17 is also moving in the same direction, the valve means remains open to admit atmospheric air to the chamber 22. As the hydraulic output increases, the hydraulic pressure in the master cylinder reacts against the rod 18 and the plate 91 from which the reaction is transmitted through levers 82 and the manual control member 36 to the pedal 21. In this manner, the operator may accurately sense the degree to which the brakes have been applied, that is, the greater the hydraulic output and brake application, the greater the manual force required on the pedal 21.

After the brakes have been applied to the desired degree, pedal movement is stopped and foot pressure is maintained. As movement of the control member 36 stops, the wall continues to move a slight additional amount. This causes the seat 72 to approach the valve element 76 and to engage it so that communication between the atmospheric air supply and the chamber 22 is interrupted. Chambers 22 and 23 remain isolated from each other and the difference in pressure acting on opposite sides of the wall is maintained to apply a constant force on the master cylinder and keep the brakes applied to the selected degree.

To release the brakes, foot pressure is released from the pedal 21. The wall 17 is held stationary by differential pressure and the hydraulic pressure in the master cylinder forces rod 18 to the right. This movement is transmitted through levers 82 to bearing 91 to move control member 36 to the right and return pedal 21 toward its normal position. As member 36 moves, seat 72 remains engaged and seat 68 disengages from the valve element and chambers 22 and 23 communicate with each other through passages 66 and 71 to reduce the pressure in chamber 22. This decreases the differential pressure acting on the wall 17 and the reaction of the hydraulic pressure coupled with the force of a coil spring disposed between the wall 17 and forward housing member 26 returns the wall toward the right. When the wall reaches a position close to the rear housing 27 the reaction element 90 returns toward its normal undistorted position and levers 82 pivot relative to the plate 91 to push to the right against ring 84 to move the wall 17 into engagement with the rear housing 27. Thereafter, movement of the member 36 to its initial position is effected by a spring 99 disposed between the seat 72 and the collar 67.

An important aspect of the invention is the operation and characteristics in the early stages of brake application. It will be noted that initial pedal movement is used only for opening of the valve which results in power output until the reaction element is fully distorted and levers 82 engage the bearing 88 so that subsequent output is the sum of the forces applied to the levers 82. One of these forces is due to manual effort and another to differential fluid pressure acting on the wall 17.

Figure 3:
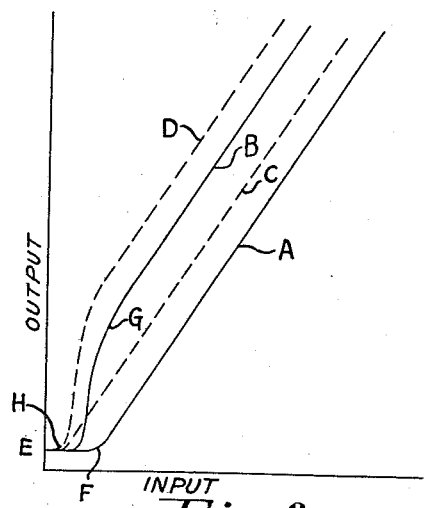
FIG. 3 is a graph illustrating operating characteristics of servo-motors for brake systems.

The significance of the performance achieved by the present invention will be more readily understood by referring to FIG. 3 showing typical brake performance curves in which the abscissa represents the manual force applied to the brake pedal and in which the ordinate represents the hydraulic output at the brakes. The slopes of the curves are parallel over a substantial portion and represent the most desirable slope which an operator is capable of sensing through the brake pedal.

Curves A and B represent performance curves for two types of brakes during application of the brakes, and curves C and D represent the performance during release of the brakes. The parallel spacing of curves A and C and curves B and D are equal and represent hysteresis of the units which cannot be avoided. In each case for zero pedal pressure, a minor output pressure is indicated at E. This is a residual pressure of the hydraulic system which is commonly provided for to insure that the hydraulic system remains at a positive pressure, i.e. higher than atmospheric pressure over a wide range of temperatures which would affect hydraulic pressure. Curve A represents performance of differential pressure motors in present use in which initial manual effort is applied not only to the valve but also to the output member. In such cases, the residual pressure remains constant during initial pedal force and then begins to slope constantly upward at point F. The corresponding release curve C remains parallel to curve A, and is straight until it merges with the residual pressure or horizontal portion of the applied curve. It is mandatory that line C does not intersect the ordinate above point E. This is a determining limitation in brake design. In other words, with limitations placed on the location of the straight release curve, the hysteresis characteristics determine the point F at which brake application can begin.

Curve B represents the brake application curve of the present invention. Since initial application is accomplished solely by power with manual force being used only for valve actuation, the curve slopes up sharply from the residual pressure line. At point G, the element 90 has been deflected so that the levers engage the valve and reaction from the generated hydraulic pressure is transmitted to the foot. At this point, brake force is the sum of manual and power output and the curve slopes upwardly parallel to curve A.

The main portion of the release curve D is parallel to curve B, but rather than follow the straight line aspects of present brake servo-motors, the lower portion of the curve slopes downward sharply and generally parallel to the corresponding portion of curve B until it intersects the residual pressure portion of the curve at point H.

It has been found that by varying the resistance to deflection offered by the element, the upper portion of the curves B and D may be displaced upwardly or downwardly without unduly disturbing the relationship at the lower part of the curves. This makes it possible to easily design a unit to produce a predetermined output by varying a single element of the unit.

Other advantages are apparent from a comparison of prior art units and the present embodiment by referring to curves A and B. In the present device, brake application begins sooner with less initial pedal effort. Furthermore, for any given values of pedal force, the resulting output of the present device is higher making for greater power output, but at the same time, maintaining the desired ratio of manual force to brake output.

It is claimed and desired to secure by Letters Patent:

1. For use in a differential pressure motor comprising a housing, a pressure responsive wall in said housing, valve means associated with said wall and being movable relative thereto to control the differential pressures acting on said wall, control means for manually moving said valve means, an output member, reaction means having first, second and third points spaced from each other and engageable with said wall, said output member and said valve means, respectively, a resilient reaction element disposed between said wall and said reaction means for engagement with the latter between said second and third points and normally maintaining said third point spaced from said valve means, said wall being initially movable to transmit force through said first point and said reaction element to said output member independently of said valve means, said reaction element being deflected during initial movement of said wall in response to resistance of said output member to engage said reaction means with said valve means and transmit movement of the latter and said wall after said initial movement of said wall.

2. For use in a differential pressure motor comprising a housing, a pressure responsive wall in said housing, valve means associated with said wall and being manually movable to control the differential pressures acting on said wall, an output member, force dividing means movable relative to said wall, said output member and said valve means and being engageable at spaced points by said wall and said valve means to transmit movement to said output member, a resilient element biased between said wall and said force dividing means and engaging the latter at a portion spaced from said points to normally maintain said force dividing means in spaced relation to said valve means, said wall transmitting movement to said output member through one of said points and said resilient element independently of said valve means during initial movement of said wall, said resilient element being deflected during subsequent movement of said wall to engage said valve means with said force dividing means and to transmit movement of said wall and said valve means to said output member.

3. In a differential pressure motor, the combination of a housing, a pressure responsive movable wall disposed in said housing, valve means movable a predetermined distance to apply a differential pressure on said wall operative to move the latter independently of said valve means, a resilient reaction element supported on said wall, force dividing means including a plurality of radially spaced levers having their radially outer ends engaged with said wall and an intermediate portion engaged with said reaction element, an output member engaged with said levers intermediate said radially outer ends and said intermediate portion, said levers having radially inner ends disposed in the path of movement of said valve means and spaced from the latter a distance greater than said predetermined distance, said wall being movable in response to movement of said valve means over said predetermined distance and independently of the latter to move said output member and deflect said reaction element, said radially inner ends, of said lever being engaged by said valve means upon deflection of said reaction element for movement of said output member jointly by said wall and said valve means.

4. A differential pressure motor having a housing, an output member and an input member movable relative to said housing, wall means movable in an initial range and in a final range, a follow up control valve means having portions carried by said input member and said wall and being movable between positions balancing pressures at opposite sides of said wall to hold the latter stationary and establishing different pressures at opposite sides to move said wall, force transmitting means connecting said wall and said output member and including radially disposed lever elements having outer ends continuously engaging said wall, resilient means interposed between said wall and said levers at a point spaced radially inward from said outer ends to maintain radially inner end of said lever spaced from said valve means, said output member engaging said lever at a point intermediate said outer end and said resilient means to pivot said levers relative to their outer ends and deflect said resilient means in response to movement of said wall in said first range, said inner ends of said levers engaging said valve means in response to deflection of said resilient means for movement of said output member by unitary movement of said wall and said valve means.

5. For use in a differential pressure motor comprising a housing, a pressure responsive wall in said housing, valve means associated with said wall and being manually movable to control the differential pressures acting on said wall, an output member, reaction means engageable with said output member, and a reaction element engageable with said wall, said reaction means having spaced portions engageable with said wall and with said reaction element, said reaction element being operative to resiliently maintain an additional portion of said reaction means in spaced relation to said valve element during initial movement of said wall to transmit powered movement of said wall to said output member independently of said valve means, said reaction element being compressed during subsequent movement of said wall to move said reaction means into engagement with said valve means to transmit powered movement of said wall and manual movement of said valve means to said output member.

6. A differential pressure motor having a housing, an output member movable relative to said housing, wall means movable in an initial range and in a final range, valve means manually movable relative to said wall between a released position in which pressures at opposite sides of said wall are equal and an applied position in which a differential pressure acts on said wall to move the latter, force transmitting means engageable with said wall and affording pivotal movement of said force transmitting means about a point fixed relative to said wall, a resilient element interposed between said force transmitting means and said wall to resiliently resist said pivotal movement of said force transmitting means and maintain said force transmitting means in spaced relation to said valve means when said wall is moving in said first range, said output member engaging said force transmitting means for pivotal movement of the latter about another point fixed relative to said output member, said reaction element being deflected upon movement of said wall from said first to said second range to engage said force transmitting means with said valve means when the latter is in said applied position for movement of said output member in response to unitary movement of said valve means and said wall.

References Cited in the file of this patent

UNITED STATES PATENTS

| | | |
|---|---|---|
| 2,322,063 | Schnell | June 15, 1943 |
| 2,826,042 | Rike et al. | Mar. 11, 1958 |
| 2,828,719 | Ayers | Apr. 1, 1958 |
| 2,867,193 | Ayers | Jan. 6, 1959 |
| 2,894,490 | Ingres | July 14, 1959 |
| 2,949,892 | Ayers | Aug. 23, 1960 |